July 12, 1949.

D. W. WALLS 2,475,928

CAMP TRAILER

Filed May 13, 1948

INVENTOR.
DANIEL W. WALLS

BY *Leech & Radue*

ATTORNEYS

July 12, 1949.　　　D. W. WALLS　　　2,475,928
CAMP TRAILER
Filed May 13, 1948　　　　　　　　　　2 Sheets-Sheet 2
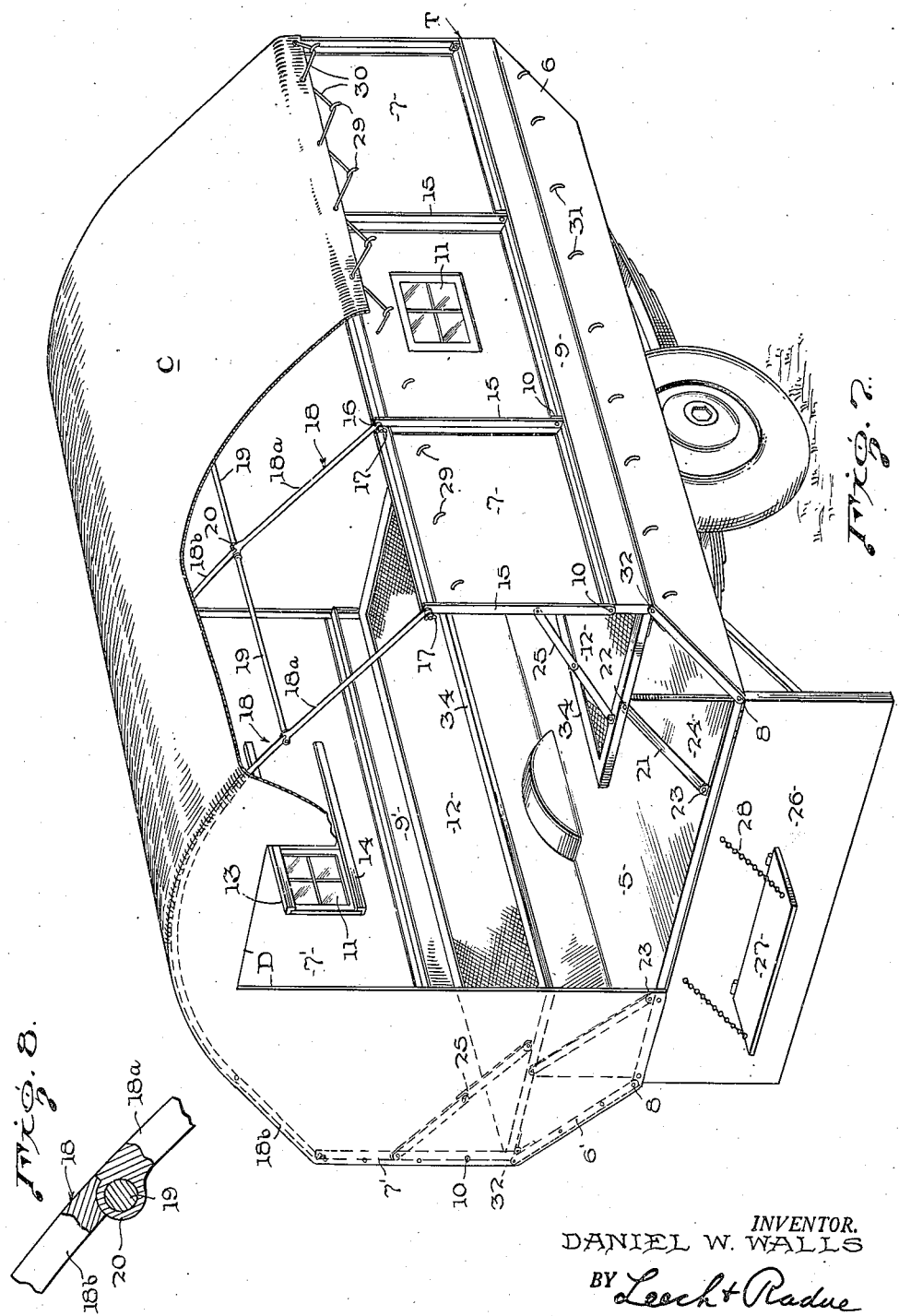
INVENTOR.
DANIEL W. WALLS
BY Leech + Radue
ATTORNEYS Patented July 12, 1949

2,475,928

UNITED STATES PATENT OFFICE 2,475,928

CAMP TRAILER

Daniel W. Walls, Binghamton, N. Y.

Application May 13, 1948, Serial No. 26,889

4 Claims. (Cl. 296—23)

This invention relates to camp trailers of the type adapted to be towed by automobiles, and particularly to a trailer that has a collapsible superstructure.

A primary object of this invention is to provide a vehicle trailer body which may be opened up with but slight physical exertion to bring beds into position for use and which will extend a tent covering into a taut position to afford a complete enclosure.

An important object of the invention is to provide a trailer body that will be comparatively low when collapsed, and which will be effectively covered by canvas or the like to form a dust and water tight closure when the trailer is being transported on the road.

Another important object resides in the provision of a novel linkage arrangement whereby the trailer body may be extended to provide room accommodations for sleeping, eating and lounging such as are necessary to satisfy the comforts of people camping.

A further object is to provide novel and simple means by which the canvas may be easily and quickly removed to afford an open air sun room, or attached as a tent for complete protection from the wind and rain.

These and other features, such as extreme simplicity of construction, low cost of production, durability, lightness in weight, and ease of operation, will become apparent in the following description of a preferred embodiment of the invention, as illustrated by the accompanying drawings, in which Fig. 1 is a rear view of the vehicle trailer body in the closed or collapsed position ready for travel;

Fig. 7 is a detailed rear view in perspective of the trailer fully opened with the canvas covering in place but partly broken away to expose details of the interior; and Fig. 8 is a detail view of one of the hinged rod supports.

Like characters of reference indicate like parts throughout the several views of the drawings, in which the present invention contemplates the use of a trailer body T adapted to be either collapsed to an exceedingly compact form for transportation or to be extended when it is desired to employ the trailer for sleeping, dressing and the like. Sleeping accommodations are provided for at least two people, although accommodations for a greater number of persons may be provided if desired. The trailer is so constructed and arranged that its adjustable parts may be moved to or from extended position with the utmost ease and in a comparatively short space of time. A cabinet (not shown) may be provided near the forward end for ice and commissary use and other storage space can be fitted beneath the bunks or cots 12 and under the flooring 5 (Figs. 3-6).

Figure 3:
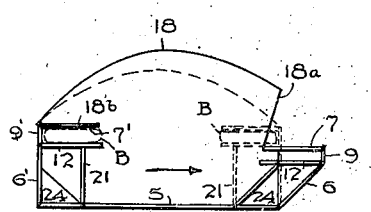
Figs. 3, 4, 5 and 6 are diagrammatic views illustrating the four successive movements necessary to extend the superstructure from the closed to the open position.
Figure 4:
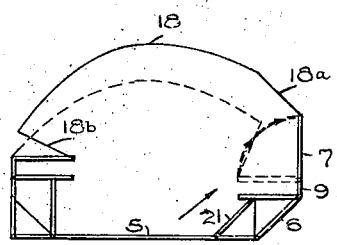
Figure 5:
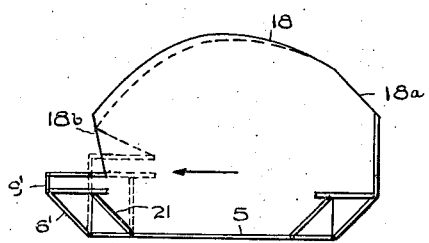
Figure 6:
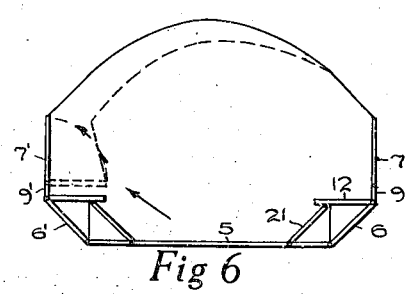

Referring now to Fig. 7, the whole trailer body T when open comprises the floor 5 and two identical side panel constructions including inclined sides 6, 6', vertical walls 7, 7' and cot frames 12. The sides 6, 6' are provided with angular extension members 9, 9', to which the walls 7, 7' are pivotally secured at 10. The angular extensions 9, 9' provide vertical space for the mattresses or blankets when the side walls 7, 7' are in the folded position, as best illustrated in Fig. 3. The frames of panels 6, 6', 7, 7' and cots 12 are preferably constructed of angle iron or aluminum sealed over and sided with plywood, metal or other suitable material. The walls 7, 7' include windows 11 which are slidably mounted between two horizontal supporting members, 13 and 14, fastened to the inside of the walls. As clearly shown, vertical angle braces 15 strengthen and protect the wall 7, 7'. These braces may be left exposed and their upper ends formed to provide individual hinge supports 16, including wing nuts 17, to which are pivotally connected canvas cover supporting bows 18. The bows 18 extend completely over the top span and are secured at right angles to continuous longitudinal brace rods 19. The bows 18 are hinged at 20, forming lengths 18a and 18b, the rods 19 providing the pivot connection for the hinges. This arrangement is quite apparent in enlarged Fig. 8, which shows shoulders on the bow lengths 18a and 18b forming limit stops for preventing the collapse of the bows 18 within the trailer.

The cot frames 12 are pivoted to the sides 6, 6' just below the pivot connection 32 of the vertical extensions 9, 9'. Brace and supporting members 21 are provided for the cots 12. There are two or more of these members, 21, for each cot, depending on the length of the trailer and the purpose of the sleeping accommodations. The members 21 are pivoted to each cot frame 12 at 22 intermediate the width and to the floor 5 at 23 beneath the outer edge portion of said cot. The members 21 extend parallel to the sides 6, 6' so as to form parallelograms with the included section of the cot frame 12 and floor 5. A right triangular shaped brace or stop 24 of substantial thinness is formed and arranged to have its hypotenuse portion engaged by the outer side edge of each parallelogram member 21 when the corresponding cot 12 is in the horizontal position of Fig. 7. A number of additional stops 24 spaced for engagement with the several braces 21 of each cot 12 will be used, or a continuous brace may be employed. This stop 24 performs the dual function of providing a support for rod member 21 and cot frame 12 when the trailer is opened for use and acting as a stop to limit the inward collapsing movement of the sides 6, 6' when the trailer is closed. Additional folding braces 25 have their respective ends pivotally connected with an intermediate length of one of the angle braces 15 and to an end of a cot 12 inwardly of its center to provide further support and stability.

The trailer T is also equipped with a tail gate 26 which swings downwardly to a position approximately flush with the ground. The gate 26 has a folding step 27 supported by chains 28.

The walls 7, 7' have hooks 29 arranged along their outer upper edge portions to which a canvas tent C is secured by means of a rope 30. Hooks 31 are also provided on the inclined sides 6, 6' so that an additional tarpaulin or canvas may be fastened when the trailer is closed; this will provide complete protection from the dust and rain. Of course, the canvas tent can perform both functions as the rope 30 could be detached from the hooks 29, the trailer folded and the skirt of the tent C secured to the hooks 31. The canvas tent C is formed with an end door D and provided with suitable closure means.

For the smooth operation of the trailer body T when opening and closing it should be noted that the length of the bows 18 between the corresponding hinge support 16 and hinged connection 20 is substantially the same length as the distance between the hinge supports 16 and 10 of the wall braces 15. Likewise the width of the cot frame 12 should conform to this length. The rod member 21 is of the same effective length as the distance between the respective hinges 8 of sides 6 and 6' and the point where the corresponding cot frame 12 is hingedly mounted on side 6 or 6'.

Figure 1:
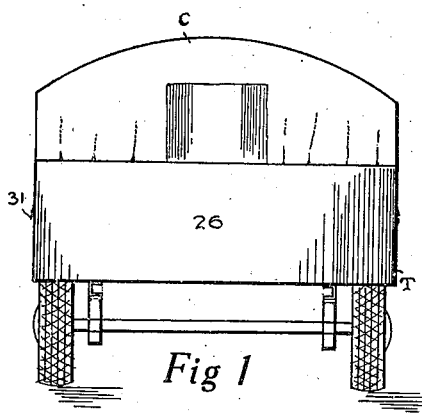
Figure 2:
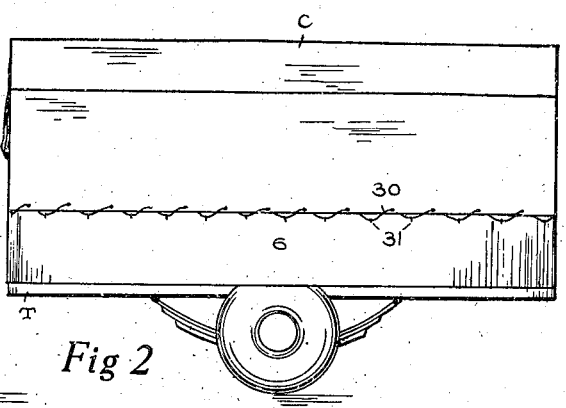
Fig. 2 is a side view of the vehicle trailer body in the same position.

The operation of the trailer of this invention is best illustrated diagrammatically in Figs. 3, 4, 5 and 6, and is as follows:

Starting with the vehicle trailer in a closed or collapsed position as shown by the dotted line of Fig. 3, it is necessary first to remove the rope 30 from the hooks 31 and to lower the tail gate 26 (Figs. 1 and 2). This will give access from the rear to the bow lengths 18a and 18b and walls 7, 7'. If two people are available they will work from opposite ends of the trailer. However, the operation will be described as if one person working from the rear were doing the job. As the first step, the rod portion 18a is swung upwardly as indicated in full lines Fig. 3, and, at the same time, force is exerted in the direction of the arrow which swings the cot 12 outwardly on the parallel linkage of rod members 21 and the side 6. The members 21 will come to rest on the triangular stops 24, upon which the bottom of the cot 12 will then be supported centrally. The second step is to raise the wall 7 in the direction of the arrows, Fig. 4. The wall 7 locks into position due to extension of the folding supporting brace 25 (Fig. 7). This step also automatically raises the rod portion 18b slightly. The third step is to open up the opposite side of the trailer by exerting force in the direction of the arrow, Fig. 5. This will cause the other cot 12 to swing outwardly on the parallel linkage of rod member 21 and the side 6', whereupon the rod member 21 will abut the stops 24. The wall 7' is then raised into position shown by the full lines of Fig. 6, the force being exerted in the direction of the arrows. The wall 7' also becomes locked in open position by straightening of the toggle-like supporting brace 25, and the canvas tent C is hooked and fastened into place. The trailer is thus set up and ready for use, and when it is desired to close the trailer body for road use the above procedure is reversed.

The inside fixtures of the trailer need not be limited to the frame for cots or bunks 12, as shown, but, as previously mentioned, storage space may be provided under the cots, and the cot frames 12 may serve as side seats, or as a foundation support for other pieces of folding furniture, such as a dressing table, and therefore it is not desired to limit the frames 12 to cot or bunk use.

An additional folding leaf may be hinged to the outer side 34 of the frame so as to open up to a full sized double bed.

The width of the trailer body illustrated herein is the same as a conventional passenger car. In length it can be short enough merely for sleeping accommodations and the commissary cabinet in the front end, or it can be long enough to carry a small boat which may be set inside of the floor 5 before folding or closing. The longer size will require extra members 21 and stops 24. Any type of bedding B may be used and it may be stored in the compartment space provided by the upper faces of the cots 12, inner sides 9, 9' and inner sides of the walls 7, 7' when the trailer is in the closed position. This arrangement is clearly shown in Fig. 3.

While I have shown and described my invention in the best form now known to me, it is obvious that structural changes and rearrangements can be made therein without departing from the spirit of the invention and the scope of the following claims.

I claim:

1. A vehicle body construction comprising a floor having parallel longitudinal edges, a side panel section secured by one edge to each of said longitudinal edges, at least one of said side panel sections being secured to said floor by a pivotal connection, a cot frame pivotally secured to the inside of said pivoted side panel section for movement about an axis parallel to the pivotal axis of the said side panel section, parallelogram linkage for said cot frame including a link having its opposite ends connected to the cot frame intermediate its width and to the adjacent floor portion, respective portions of the floor, side panel section and cot frame for maintaining said cot frame in parallel relation to the floor during movement, and a stop for said parallelogram linkage having an outer face perpendicular to the floor and in alignment with the pivotal connection of said side panel to the floor and an inner face making an acute angle therewith disposed for engagement by the link when the said side panel is swung outwardly to a predetermined position.

2. A vehicle trailer body construction comprising a floor having parallel longitudinal edges, a side panel section pivotally secured by one edge to each of said longitudinal edges of the floor, a cot frame hingedly connected along one side to the inside of each side panel section for movement about an axis parallel to the pivotal axis of the respective side panel section, a link having its opposite ends pivotally connected to each cot frame intermediate its width and to the adjacent floor portion, each of said links being proportioned and arranged to form with the respective cot frame, side panel section and adjacent floor portion an adjustable parallelogram whereby the cot frame will be maintained horizontal as the side panel section is pivoted outward, and a triangular stop for each cot frame having an upright face arranged to limit inward pivotal movement of the respective panel section to an upright position and an inwardly and downwardly inclined face arranged to limit outward pivotal movement of the respective link.

3. A vehicle trailer body construction comprising a rectangular floor; a side panel section hingedly connected by one edge to each of an opposite pair of edges of said floor; a cot frame pivotally secured to the inside of each side panel section for movement about an axis parallel to the hinge axis of the respective side panel section; parallelogram linkage for each cot frame including respective portions of the floor, side panel sections and cot frames for maintaining said cot frames in parallel relation to the floor during movement, and a right triangular stop for each parallelogram linkage having one face perpendicular to the floor to limit inward pivotal movement of the respective side panel section to an upright position, a hypotenuse portion engageable by the inner side edge of the corresponding parallelogram linkage to limit the outward pivotal movement of the respective side panel section and a supporting surface formed at the apex of the perpendicular face and the hypotenuse portion of said right triangular stop and arranged to engage the underside of the respective cot frame when said frame is moved outwardly with the side panel section to which it is secured.

4. A trailer body construction comprising a rectangular floor, side sections hinged along their respective lower edges to the opposite edges of said floor; a wall member hinged along its lower edge to the upper edge of each side section; cot frame members hinged at one end to each side section a short distance below the upper edge thereof, a brace member pivotally secured to said floor and to each cot frame to form with each side section parallelogram linkage; a right triangular stop for said parallelogram linkage having an outer face perpendicular to the floor and an inner face making an acute angle therewith, a toggle supporting brace pivotally secured to an outward portion of each cot frame and to the respective wall member; a plurality of top supporting bows pivotally secured at each end to the upper edge of one of said wall members; and a flexible top covering extending over said bows; each of said supporting bows having an outwardly collapsing hinged joint adjacent each point where the supporting bow is pivotally secured to the wall members, whereby the end portions of said supporting bows and the respective wall members are folded inwardly of the trailer body upon movement of the side sections toward their respective stops.

DANIEL W. WALLS.

REFERENCES CITED

The following references are of record in the file of this patent:

UNITED STATES PATENTS

| Number | Name | Date |
|---|---|---|
| 560,706 | Gage | May 26, 1896 |

FOREIGN PATENTS

| Number | Country | Date |
|---|---|---|
| 29,574 | Australia | 1930 |